Dec. 18, 1928.
P. J. BODE
1,696,026
FISHING TACKLE
Filed Oct. 5, 1927
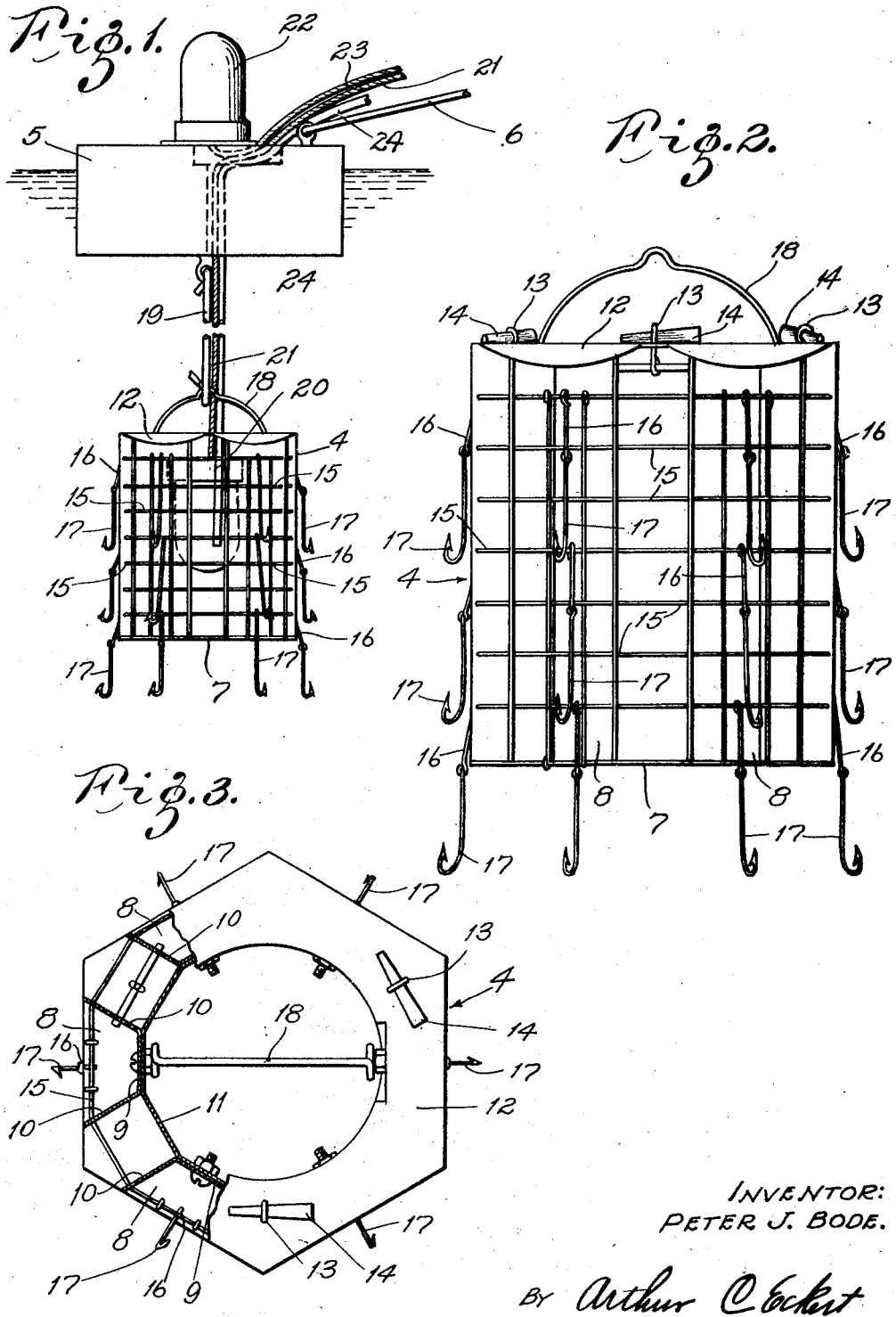
INVENTOR:
PETER J. BODE.
By Arthur C Eckert
ATTORNEY Patented Dec. 18, 1928.

1,696,026

UNITED STATES PATENT OFFICE.

PETER J. BODE, OF ST. LOUIS, MISSOURI.

FISHING TACKLE.

Application filed October 5, 1927. Serial No. 224,066.

The object of my device is to devise a fishing tackle having a plurality of fishing hooks suspended therefrom, providing a variety of bait, providing a light which is submerged in the water for the purpose of attracting the fish. A further object is to devise a fishing tackle which can be effectively used at night and one in which the cork or float is illuminated and one in which the entire tackle is suspended from a single line. A further object is to make a fishing tackle in which garbage or other refuse may be used to attract the fish to the hooks and one in which the light will be reflected and emitted at practically all angles. A still further object is to devise a fishing tackle by which the fish are attracted through the emission of compressed air in the water near a portion of the tackle, thereby causing an agitation of the water, creating the appearance of the presence of fish or animal life.

My device may be made of few and simple parts that lend themselves readily to multiple production, that may be easily assembled, that are light in weight and practically indestructible.

With these and other objects in view, my invention has relation to certain novel features of construction and arrangement of parts as will be hereinafter more fully described, pointed out in the claims and illustrated in the drawing in which, Fig. 1 is a side elevation of my device in operative position in water.

Fig. 2 is a side elevation of the bait element, showing the positioning of the hooks, showing the garbage or refuse receptacles.

Fig. 3 is a plan view of the bait element with a portion broken away, showing the garbage receptacles in section.

Numeral 4 designates the bait element generally, numeral 5 the float or cork, numeral 6 the line by which the tackle is held by the fisherman. The bait element 4 consists of the polygonal base plate 7 to which are soldered or secured by any conventional means the longitudinal garbage receptacles 8. These garbage receptacles 8 are trough shaped having inner walls 9 and the side walls 10. The outer edges of the side walls 10 of the garbage receptacles 8 are flush with the edges of the base plate 7 and are centrally positioned relative the sides of the base plate 7, that is to say, one garbage receptacle 8 is provided for each side of the base plate 7. In order to secure the garbage receptacles 8 in such position at their upper ends, the frame element 11 is provided. The tops of the inner walls 9 of the garbage receptacles 8 are secured to the frame element 11 by means of bolts or other securing means. Numeral 12 designates a top plate that is positioned on top of the upper edges of the garbage receptacles 8 and selectively secured thereto by means of eyes 13 secured to the tops of the garbage receptacles 8 in any conventional manner and passing through holes properly spaced in the top plate 12. Numerals 14 designate pegs passing through the eyes 13 above the top plate 12, thereby selectively securing the top plate 12 to the remainder of the bait element 4. Through holes near the outer edges of the side walls 10 of the garbage receptacle 8 wires 15 pass circumferentially. There are seven such wires shown in Figs. 1 and 2. To these wires are secured pivotally shorter wires 16 to which are secured the fish hooks 17.

Large concentric holes are formed in the base plate 7 and in the top plate 12. Numeral 18 designates a handle pivotally secured to the frame element 11. Numeral 19 designates a cord having one end secured to the center of the handle 18 and the other end centrally secured to the lower surface of the float 5. The float 5 is made of such size and material and weight relative to the size, material and weight of the bait element 4, that when the two are placed in the water, the float will sustain the bait element. Numerical 20 designates an electric light of the type that is used for submersion under water, that is to say, the light bulb is enclosed in an outer casing or bulb of glass so that when the light is immersed in the water, the latter will not come into contact with the surface of the light bulb proper. Numeral 21 designates a cord secured to the electric light 20 and passes upward around or through the float 5 parallel with the line 6 to the hand of the fisherman. Numeral 22 designates a similar light positioned on the cork or float 5 on its upper surface. Numeral 23 designates a cord passing from the electric light 22 parallel to the line 6, to the hand of the fisherman. The fisherman has a source of current such as a battery near him and connects this source of current through the cords 21 and 23 to the lights 20 and 22 respectively. In each circuit is included a switch by which the fisherman is enabled to close a circuit from the source of current to either light 20 or 22 selectively. The switches and sources of current and wiring are conventional and for that reason are not shown. A hose 24 has its lower end submerged in the bait element 4 near the light 20 and extends upwardly by or through the float 5 parallel to the line 6 to the fisherman who has a tank of compressed air conveniently positioned with a valve by the control of which he is enabled to permit the flow of air through the hose 24 into the water at the lower end of the hose, thereby forming bubbles in the water. Any convenient means as a pulley or otherwise may be used to alter the relative position of the bait element 4 and the float 5 for the purpose of varying the depth of the bait element 4. The rays of light from the electric light 20 pass outwardly through the spaces between the garbage receptacle 8 into the water. These beams of light attract the fish to the bait element. The bubbles create the impression to the fish that another fish or frog or crawfish is on the interior of the bait element 4 and thereby attracts the fish to the bait element 4. This is particularly true for the larger fish.

The light 22 enables the fisherman to see when the float 5 is moved or submerged by fish either biting on the hooks 17 or nibbling on them.

The odor of the garbage or refuse in the garbage receptacles 8 also tends to attract the fish to the bait element 4. Refuse of different kinds may be placed in the different garbage receptacles so as to register various appeals to the fish.

What I claim and mean to secure by Letters Patent is:

1. A bait element comprising a base plate and a top plate and garbage receptacles, the garbage receptacles having one end secured to the base plate and the other to the top plate, fish hooks secured to wires encircling the receptacles.

2. A bait element comprising a base plate and a selectively removable top plate and garbage receptacles the lower ends of which are secured to the base plate and the upper ends of which are secured together by a frame element, wires encircling said receptacles, fish hooks secured to wires, which in turn are secured to said circumferential wires.

3. In combination with a bait element, a float, the bait element and float held in operative relationship, a light suspended in said bait element and a light secured to said float, wires connected to said lights, a line connected to said float.

4. In combination with a bait element, a float, the former operatively secured to the latter, a hose passing into said bait element for the purpose of conducting compressed air to the interior of said bait element and liberating it at that point.

In testimony whereof I affix my signature.

PETER J. BODE.